(12) United States Patent  (10) Patent No.: US 8,023,773 B2
Brunk et al.  (45) Date of Patent: Sep. 20, 2011

(54) METHODS, APPARATUS AND PROGRAMS FOR GENERATING AND UTILIZING CONTENT SIGNATURES

(75) Inventors: Hugh L. Brunk, Portland, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1167 days.

(21) Appl. No.: 11/613,876

(22) Filed: Dec. 20, 2006

(65) Prior Publication Data

US 2007/0101147 A1 May 3, 2007

Related U.S. Application Data

(63) Continuation of application No. 10/027,783, filed on Dec. 19, 2001, now Pat. No. 7,289,643.

(60) Provisional application No. 60/257,822, filed on Dec. 21, 2000, provisional application No. 60/263,490, filed on Jan. 22, 2001.

(51) Int. Cl.
*G06K 9/00* (2006.01)
(52) U.S. Cl. ............. 382/305; 382/100; 382/307
(58) Field of Classification Search .......... 382/305–307, 382/100
See application file for complete search history.

(56) References Cited

U.S. PATENT DOCUMENTS

| | | | |
|---|---|---|---|
| 3,810,156 A | 5/1974 | Goldman | |
| 3,919,479 A | 11/1975 | Moon et al. | |
| 4,071,698 A | 1/1978 | Barger, Jr. et al. | |
| 4,230,990 A | 10/1980 | Lert, Jr. et al. | |
| 4,284,846 A | 8/1981 | Marley | |
| 4,432,096 A | 2/1984 | Bunge | |
| 4,450,531 A | 5/1984 | Kenyon et al. | |
| 4,495,526 A | 1/1985 | Baranoff-Rossine | |
| 4,499,601 A | 2/1985 | Matthews | |
| 4,511,917 A | 4/1985 | Kohler et al. | |
| 4,547,804 A | 10/1985 | Greenberg | |
| 4,677,466 A | 6/1987 | Lert, Jr. et al. | |
| 4,682,370 A | 7/1987 | Matthews | |
| 4,697,209 A | 9/1987 | Kiewit et al. | |
| 4,776,017 A | 10/1988 | Fujimoto | |
| 4,843,562 A | 6/1989 | Kenyon et al. | |

(Continued)

FOREIGN PATENT DOCUMENTS

EP  161512  11/1985

(Continued)

OTHER PUBLICATIONS

Cox et al., "Secure Spread Spectrum Watermarking for Images, Audio and Video," 1996 IEEE, pp. 243-246.

(Continued)

*Primary Examiner* — Wesley Tucker

(57) ABSTRACT

The present invention generally relates to deriving and/or utilizing content signatures (e.g., so-called "fingerprints"). One claim recites a method including: obtaining data from a remote device, the data comprising a reduce-bit representation of an audio or video signal; utilizing at least a processor or electronic processing circuitry, deriving a fingerprint of the data, the fingerprint of the data serves as an identifier of the audio or video signal, and comprises an even more reduce-bit representation of the audio or video signal relative to the data; using at least the fingerprint, obtaining information or content associated with the audio or video signal; and providing the information or content to the remote device or to a device associated with the remote device. Of course, additional claims and combinations are provided as well.

27 Claims, 5 Drawing Sheets

U.S. PATENT DOCUMENTS

| | | | |
|---|---|---|---|
| 4,972,471 | A | 11/1990 | Gross |
| 4,994,831 | A | 2/1991 | Marandi |
| 5,019,899 | A | 5/1991 | Boles et al. |
| 5,276,629 | A | 1/1994 | Reynolds |
| 5,303,393 | A | 4/1994 | Noreen et al. |
| 5,400,261 | A | 3/1995 | Reynolds |
| 5,436,653 | A | 7/1995 | Ellis et al. |
| 5,437,050 | A | 7/1995 | Lamb et al. |
| 5,486,686 | A | 1/1996 | Zdybel, Jr. et al. |
| 5,504,518 | A | 4/1996 | Ellis et al. |
| 5,539,635 | A | 7/1996 | Larson, Jr. |
| 5,564,073 | A | 10/1996 | Takahisa |
| 5,572,246 | A | 11/1996 | Ellis et al. |
| 5,572,653 | A | 11/1996 | DeTemple et al. |
| 5,574,519 | A | 11/1996 | Manico et al. |
| 5,574,962 | A | 11/1996 | Fardeau et al. |
| 5,577,249 | A | 11/1996 | Califano |
| 5,577,266 | A | 11/1996 | Takahisa et al. |
| 5,579,124 | A | 11/1996 | Aijala et al. |
| 5,581,658 | A | 12/1996 | O'Hagan et al. |
| 5,581,800 | A | 12/1996 | Fardeau et al. |
| 5,584,070 | A | 12/1996 | Harris et al. |
| 5,612,729 | A | 3/1997 | Ellis et al. |
| 5,619,571 | A * | 4/1997 | Sandstrom et al. ............ 380/200 |
| 5,621,454 | A | 4/1997 | Ellis et al. |
| 5,640,193 | A | 6/1997 | Wellner |
| 5,646,997 | A | 7/1997 | Barton |
| 5,661,787 | A | 8/1997 | Pocock |
| 5,663,766 | A | 9/1997 | Sizer, II |
| 5,671,267 | A | 9/1997 | August et al. |
| 5,708,478 | A | 1/1998 | Tognazzini |
| 5,761,606 | A | 6/1998 | Wolzien |
| 5,765,152 | A | 6/1998 | Erickson |
| 5,765,176 | A | 6/1998 | Bloomberg |
| 5,774,452 | A | 6/1998 | Wolosewicz |
| 5,778,192 | A | 7/1998 | Schuster et al. |
| 5,781,914 | A | 7/1998 | Stork et al. |
| 5,809,317 | A | 9/1998 | Kogan et al. |
| 5,832,119 | A | 11/1998 | Rhoads |
| 5,841,978 | A | 11/1998 | Rhoads |
| 5,860,074 | A | 1/1999 | Rowe et al. |
| 5,862,260 | A | 1/1999 | Rhoads |
| 5,889,868 | A | 3/1999 | Moskowitz et al. |
| 5,892,900 | A | 4/1999 | Ginter et al. |
| 5,893,095 | A | 4/1999 | Jain et al. |
| 5,901,224 | A | 5/1999 | Hecht |
| 5,902,353 | A | 5/1999 | Reber et al. |
| 5,903,892 | A | 5/1999 | Hoffert et al. |
| 5,905,248 | A | 5/1999 | Russell et al. |
| 5,905,800 | A | 5/1999 | Moskowitz et al. |
| 5,913,203 | A * | 6/1999 | Wong et al. ...................... 705/39 |
| 5,918,223 | A | 6/1999 | Blum et al. |
| 5,930,369 | A | 7/1999 | Cox et al. |
| 5,938,727 | A | 8/1999 | Ikeda |
| 5,943,422 | A | 8/1999 | Van Wie et al. |
| 5,956,716 | A | 9/1999 | Kenner et al. |
| 5,973,731 | A | 10/1999 | Schwab |
| 5,982,956 | A | 11/1999 | Lahmi |
| 5,983,176 | A | 11/1999 | Hoffert et al. |
| 5,986,651 | A | 11/1999 | Reber et al. |
| 5,986,692 | A | 11/1999 | Logan et al. |
| 5,991,737 | A | 11/1999 | Chen |
| 5,995,105 | A | 11/1999 | Reber et al. |
| 6,028,960 | A | 2/2000 | Graf et al. |
| 6,081,629 | A | 6/2000 | Browning |
| 6,081,827 | A | 6/2000 | Reber et al. |
| 6,081,830 | A | 6/2000 | Schindler |
| 6,084,528 | A | 7/2000 | Beach et al. |
| 6,088,455 | A | 7/2000 | Logan et al. |
| 6,115,741 | A | 9/2000 | Domenikos et al. |
| 6,121,530 | A | 9/2000 | Sonoda |
| 6,122,403 | A | 9/2000 | Rhoads |
| 6,138,151 | A | 10/2000 | Reber et al. |
| 6,157,721 | A | 12/2000 | Shear et al. |
| 6,164,534 | A | 12/2000 | Rathus et al. |
| 6,169,541 | B1 | 1/2001 | Smith |
| 6,199,048 | B1 | 3/2001 | Hudetz et al. |
| 6,201,879 | B1 | 3/2001 | Bender et al. |
| 6,219,787 | B1 | 4/2001 | Brewer |
| 6,282,362 | B1 | 8/2001 | Murphy et al. |
| 6,286,036 | B1 | 9/2001 | Rhoads |
| 6,311,214 | B1 | 10/2001 | Rhoads |
| 6,314,457 | B1 | 11/2001 | Schena et al. |
| 6,321,992 | B1 | 11/2001 | Knowles et al. |
| 6,324,573 | B1 | 11/2001 | Rhoads |
| 6,345,104 | B1 | 2/2002 | Rhoads |
| 6,386,453 | B1 | 5/2002 | Russell et al. |
| 6,389,055 | B1 | 5/2002 | August et al. |
| 6,401,206 | B1 | 6/2002 | Khan et al. |
| 6,408,331 | B1 | 6/2002 | Rhoads |
| 6,411,725 | B1 | 6/2002 | Rhoads |
| 6,425,081 | B1 | 7/2002 | Iwamura |
| 6,434,561 | B1 | 8/2002 | Durst, Jr. et al. |
| 6,439,465 | B1 | 8/2002 | Bloomberg |
| 6,442,285 | B2 | 8/2002 | Rhoads et al. |
| 6,496,802 | B1 | 12/2002 | Van Zoest et al. |
| 6,505,160 | B1 | 1/2003 | Levy |
| 6,522,769 | B1 | 2/2003 | Rhoads et al. |
| 6,526,449 | B1 | 2/2003 | Philyaw et al. |
| 6,542,927 | B2 | 4/2003 | Rhoads |
| 6,542,933 | B1 | 4/2003 | Durst, Jr. et al. |
| 6,553,129 | B1 | 4/2003 | Rhoads |
| 6,574,594 | B2 | 6/2003 | Pitman et al. |
| 6,577,746 | B1 | 6/2003 | Evans et al. |
| 6,611,524 | B2 | 8/2003 | Devanagondi et al. |
| 6,611,607 | B1 | 8/2003 | Davis et al. |
| 6,614,914 | B1 | 9/2003 | Rhoads |
| 6,658,568 | B1 | 12/2003 | Ginter et al. |
| 6,674,876 | B1 | 1/2004 | Hannigan et al. |
| 6,748,360 | B2 | 6/2004 | Pitman et al. |
| 6,748,533 | B1 | 6/2004 | Wu |
| 6,768,980 | B1 | 7/2004 | Meyer et al. |
| 6,785,421 | B1 | 8/2004 | Gindele et al. |
| 6,804,376 | B2 | 10/2004 | Rhoads et al. |
| 6,807,534 | B1 | 10/2004 | Erickson |
| 6,829,368 | B2 | 12/2004 | Meyer et al. |
| 6,834,308 | B1 | 12/2004 | Ikezoye |
| 6,850,626 | B2 | 2/2005 | Rhoads et al. |
| 6,870,547 | B1 | 3/2005 | Crosby et al. |
| 6,931,451 | B1 | 8/2005 | Logan et al. |
| 6,941,275 | B1 | 9/2005 | Swierczek |
| 6,965,682 | B1 | 11/2005 | Davis et al. |
| 6,973,669 | B2 | 12/2005 | Daniels |
| 7,010,144 | B1 | 3/2006 | Davis et al. |
| 7,171,018 | B2 | 1/2007 | Rhoads et al. |
| 7,185,201 | B2 | 2/2007 | Rhoads et al. |
| 7,289,643 | B2 | 10/2007 | Brunk et al. |
| 7,302,574 | B2 | 11/2007 | Conwell et al. |
| 7,333,957 | B2 | 2/2008 | Levy et al. |
| 7,349,552 | B2 | 3/2008 | Levy et al. |
| 7,505,605 | B2 | 3/2009 | Rhoads et al. |
| 7,545,951 | B2 | 6/2009 | Davis et al. |
| 7,562,392 | B1 | 7/2009 | Rhoads et al. |
| 7,565,294 | B2 | 7/2009 | Rhoads |
| 7,587,602 | B2 | 9/2009 | Rhoads |
| 7,590,259 | B2 | 9/2009 | Levy et al. |
| 7,593,576 | B2 | 9/2009 | Meyer et al. |
| 7,650,010 | B2 | 1/2010 | Levy et al. |
| 7,711,564 | B2 | 5/2010 | Levy et al. |
| 7,930,546 | B2 | 4/2011 | Rhoads et al. |
| 2001/0011233 | A1 | 8/2001 | Narayanaswami |
| 2001/0026618 | A1 | 10/2001 | Van Wie et al. |
| 2001/0026629 | A1 | 10/2001 | Oki |
| 2001/0031066 | A1 | 10/2001 | Meyer et al. |
| 2001/0044744 | A1 | 11/2001 | Rhoads |
| 2001/0044824 | A1 | 11/2001 | Hunter et al. |
| 2001/0053234 | A1 | 12/2001 | Rhoads |
| 2001/0055391 | A1 | 12/2001 | Jacobs |
| 2002/0021805 | A1 | 2/2002 | Schumann et al. |
| 2002/0021822 | A1 | 2/2002 | Maeno |
| 2002/0023020 | A1 | 2/2002 | Kenyon et al. |
| 2002/0023148 | A1 | 2/2002 | Ritz et al. |
| 2002/0023218 | A1 | 2/2002 | Lawandy et al. |
| 2002/0028000 | A1 | 3/2002 | Conwell et al. |
| 2002/0032698 | A1 | 3/2002 | Cox |
| 2002/0040433 | A1 | 4/2002 | Kondo |
| 2002/0052885 | A1 | 5/2002 | Levy |

| | | |
|---|---|---|
| 2002/0059580 A1 | 5/2002 | Kalker |
| 2002/0069370 A1 | 6/2002 | Mack |
| 2002/0072982 A1 | 6/2002 | Van de Sluis |
| 2002/0072989 A1 | 6/2002 | Van de Sluis |
| 2002/0075298 A1 | 6/2002 | Schena et al. |
| 2002/0083123 A1 | 6/2002 | Freedman et al. |
| 2002/0102966 A1 | 8/2002 | Lev et al. |
| 2002/0126872 A1 | 9/2002 | Brunk |
| 2002/0133499 A1 | 9/2002 | Ward et al. |
| 2002/0150165 A1 | 10/2002 | Huizer |
| 2002/0152388 A1 | 10/2002 | Linnartz et al. |
| 2002/0161741 A1 | 10/2002 | Wang et al. |
| 2002/0178410 A1 | 11/2002 | Haitsma et al. |
| 2003/0018709 A1 | 1/2003 | Schrempp et al. |
| 2003/0033321 A1 | 2/2003 | Schrempp et al. |
| 2003/0037010 A1 | 2/2003 | Schmelzer et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0145661 A1 | 7/2004 | Murakami et al. |
| 2004/0163106 A1 | 8/2004 | Schrempp et al. |
| 2004/0169892 A1 | 9/2004 | Yoda |
| 2004/0201676 A1 | 10/2004 | Needham |
| 2004/0223626 A1 | 11/2004 | Honsinger et al. |
| 2005/0044189 A1 | 2/2005 | Ikezoye et al. |
| 2007/0033409 A1 | 2/2007 | Brunk et al. |
| 2007/0100757 A1 | 5/2007 | Rhoads |
| 2007/0101147 A1 | 5/2007 | Brunk et al. |
| 2007/0185840 A1 | 8/2007 | Rhoads |
| 2007/0195987 A1 | 8/2007 | Rhoads |
| 2007/0250194 A1 | 10/2007 | Rhoads et al. |
| 2007/0250716 A1 | 10/2007 | Brunk et al. |
| 2008/0028223 A1 | 1/2008 | Rhoads |
| 2008/0133416 A1 | 6/2008 | Rhoads |
| 2008/0133556 A1 | 6/2008 | Conwell et al. |
| 2008/0140573 A1 | 6/2008 | Levy et al. |
| 2008/0319859 A1 | 12/2008 | Rhoads |
| 2009/0089586 A1 | 4/2009 | Brunk et al. |
| 2009/0089587 A1 | 4/2009 | Brunk et al. |
| 2009/0177742 A1 | 7/2009 | Rhoads et al. |
| 2010/0008586 A1 | 1/2010 | Meyer et al. |
| 2010/0009722 A1 | 1/2010 | Levy et al. |
| 2010/0036881 A1 | 2/2010 | Rhoads et al. |
| 2010/0046744 A1 | 2/2010 | Rhoads et al. |
| 2010/0138012 A1 | 6/2010 | Rhoads |
| 2010/0150395 A1 | 6/2010 | Davis et al. |
| 2010/0185306 A1 | 7/2010 | Rhoads |
| 2010/0322035 A1 | 12/2010 | Rhoads et al. |

FOREIGN PATENT DOCUMENTS

| | | |
|---|---|---|
| EP | 493091 | 7/1992 |
| EP | 953938 | 11/1999 |
| EP | 0967803 | 12/1999 |
| EP | 1173001 | 1/2002 |
| JP | 11265396 | 9/1999 |
| WO | WO9803923 | 1/1998 |
| WO | WO9935809 | 7/1999 |
| WO | WO0058940 | 10/2000 |
| WO | WO0115021 | 3/2001 |
| WO | WO0120483 | 3/2001 |
| WO | WO0120609 | 3/2001 |
| WO | WO0162004 | 8/2001 |
| WO | WO0171517 | 9/2001 |
| WO | WO0175629 | 10/2001 |
| WO | WO0211123 | 2/2002 |
| WO | WO0219589 | 3/2002 |
| WO | WO0227600 | 4/2002 |

OTHER PUBLICATIONS

Ghias et al, Query by Humming: Musical Information Retrieval in an Audio Database. In ACM Multimedia, pp. 231-236, Nov. 1995.

Kageyama et al, Melody Retrieval with Humming, Proceedings of Int. Computer Music Conference (ICMC), 1993.

Lin, et al., "Generating Robust Digital Signature for Image/Video Authentication," Proc. Multimedia and Security workshop at ACM MULTIMEDIA'98, Sep. 1, 1998, pp. 49-54.

Muscle Fish press release, Muscle Fish's Audio Search Technology to be Encapsulated into Informix Datablade Module, Jul. 10, 1996.

Wold et al, Content-Based Classification, Search, and Retrieval of Audio, IEEE Multimedia Magazine, Fall, 1996.

PCT/US01/50238 Notification of Transmittal of the International Search Report or the Declaration and International Search Report dated May 31, 2002.

PCT/US01/50238 Written Opinion dated Feb. 13, 2003.

U.S. Appl. No. 60/232,618, filed Sep. 14, 2000, Cox.

U.S. Appl. No. 60/257,822, filed Dec. 21, 2000, Aggson et al.

U.S. Appl. No. 60/263,490, filed Jan. 22, 2001, Brunk et al.

\* cited by examiner

METHODS, APPARATUS AND PROGRAMS FOR GENERATING AND UTILIZING CONTENT SIGNATURES

RELATED APPLICATION DATA

This application is a continuation of U.S. patent application Ser. No. 10/027,783, filed Dec. 19, 2001 (published as US 2002-0126872 A1). The Ser. No. 10/027,783 application claims the benefit of U.S. Provisional Application No. 60/257,822, filed Dec. 21, 2000, and U.S. Provisional Application No. 60/263,490, filed Jan. 22, 2001. Each of these patent documents is hereby incorporated by reference.

The subject matter of the present application is related to that disclosed in U.S. Pat. No. 5,862,260, and in the following co-pending U.S. patent application Ser. No. 09/503,881, filed Feb. 14, 2000 (now U.S. Pat. No. 6,614,914); U.S. patent application Ser. No 09/563,664, filed May 2, 2000 (now U.S. Pat. No. 6,505,160); U.S. patent application Ser. No 09/620,019, filed Jul. 20, 2000; and U.S. patent application Ser. No 09/661,900, filed Sep. 14, 2000 (now U.S. Pat. No. 6,674,879). Each of these patent documents is hereby incorporated by reference.

TECHNICAL FIELD

The present invention relates generally to deriving identifying information from data. More particularly, the present invention relates to content signatures derived from data, and to applications utilizing such content signatures.

BACKGROUND AND SUMMARY

Advances in software, computers and networking systems have created many new and useful ways to distribute, utilize and access content items (e.g., audio, visual, and/or video signals). Content items are more accessible than ever before. As a result, however, content owners and users have an increasing need to identify, track, manage, handle, link content or actions to, and/or protect their content items.

These types of needs may be satisfied, as disclosed in this application, by generating a signature of a content item (e.g., a "content signature"). A content signature represents a corresponding content item. Preferably, a content signature is derived (e.g., calculated, determined, identified, created, etc.) as a function of the content item itself. The content signature can be derived through a manipulation (e.g., a transformation, mathematical representation, hash, etc.) of the content data. The resulting content signature may be utilized to identify, track, manage, handle, protect the content, link to additional information and/or associated behavior, and etc. Content signatures are also known as "robust hashes" and "fingerprints," and are used interchangeably throughout this disclosure.

Content signatures can be stored and used for identification of the content item. A content item is identified when a derived signature matches a predetermined content signature. A signature may be stored locally, or may be remotely stored. A content signature may even be utilized to index (or otherwise be linked to data in) a related database. In this manner, a content signature is utilized to access additional data, such as a content ID, licensing or registration information, other metadata, a desired action or behavior, and validating data. Other advantages of a content signature may include identifying attributes associated with the content item, linking to other data, enabling actions or specifying behavior (copy, transfer, share, view, etc.), protecting the data, etc.

A content signature also may be stored or otherwise attached with the content item itself, such as in a header (or footer) or frame headers of the content item. Evidence of content tampering can be identified with an attached signature. Such identification is made through re-deriving a content signature using the same technique as was used to derive the content signature stored in the header. The newly derived signature is compared with the stored signature. If the two signatures fail to match (or otherwise coincide), the content item can be deemed altered or otherwise tampered with. This functionality provides an enhanced security and verification tool.

A content signature may be used in connection with digital watermarking. Digital watermarking is a process for modifying physical or electronic media (e.g., data) to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. And the decoder analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending patent application Ser. No. 09/503,881 (now U.S. Pat. No. 6,614,914) and in U.S. Pat. No. 5,862,260, which are referenced above.

According to one aspect of our invention, the digital watermark may be used in conjunction with a content signature. The watermark can provide additional information, such as distributor and receiver information for tracking the content. The watermark data may contain a content signature and can be compared to the content signature at a later time to determine if the content is authentic. As discussed above regarding a frame header, a content signature can be compared to digital watermark data, and if the content signature and digital watermark data match (or otherwise coincide) the content is determined to be authentic. If different, however, the content is considered modified.

According to another aspect of the present invention, a digital watermark may be used to scale the content before deriving a content signature of the content. Content signatures are sensitive to scaling (e.g., magnification, scaling, rotation, distortion, etc.). A watermark can include a calibration and/or synchronization signal to realign the content to a base state. Or a technique can be used to determine a calibration and/or synchronization based upon the watermark data during the watermark detection process. This calibration signal (or technique) can be used to scale the content so it matches the scale of the content when the content signature was registered in a database or first determined, thus reducing errors in content signature extraction.

DETAILED DESCRIPTION

The following sections describe methods, apparatus, and/or programs for generating, identifying, handling, linking and utilizing content signatures. The terms "content signature," "fingerprint," "hash," and "signature" are used interchangeably and broadly herein. For example, a signature may include a unique identifier (or a fingerprint) or other unique representation that is derived from a content item. Alternatively, there may be a plurality of unique signatures derived from the same content item. A signature may also correspond to a type of content (e.g., a signature identifying related content items). Consider an audio signal. An audio signal may be divided into segments (or sets), and each segment may include a signature. Also, changes in perceptually relevant features between sequential (or alternating) segments may also be used as a signature. A corresponding database may be structured to index a signature (or related data) via transitions of data segments based upon the perceptual features of the content.

As noted above, a content signature is preferably derived as a function of the content item itself. In this case, a signature of a content item is computed based on a specified signature algorithm. The signature may include a number derived from a signal (e.g., a content item) that serves as a statistically unique identifier of that signal. This means that there is a high probability that the signature was derived from the digital signal in question. One possible signature algorithm is a hash (e.g., an algorithm that converts a signal into a lower number of bits). The hash algorithm may be applied to a selected portion of a signal (e.g., the first 10 seconds, a video frame or a image block, etc.) to create a signal. The hash may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, and SHA1.

Figure 1:
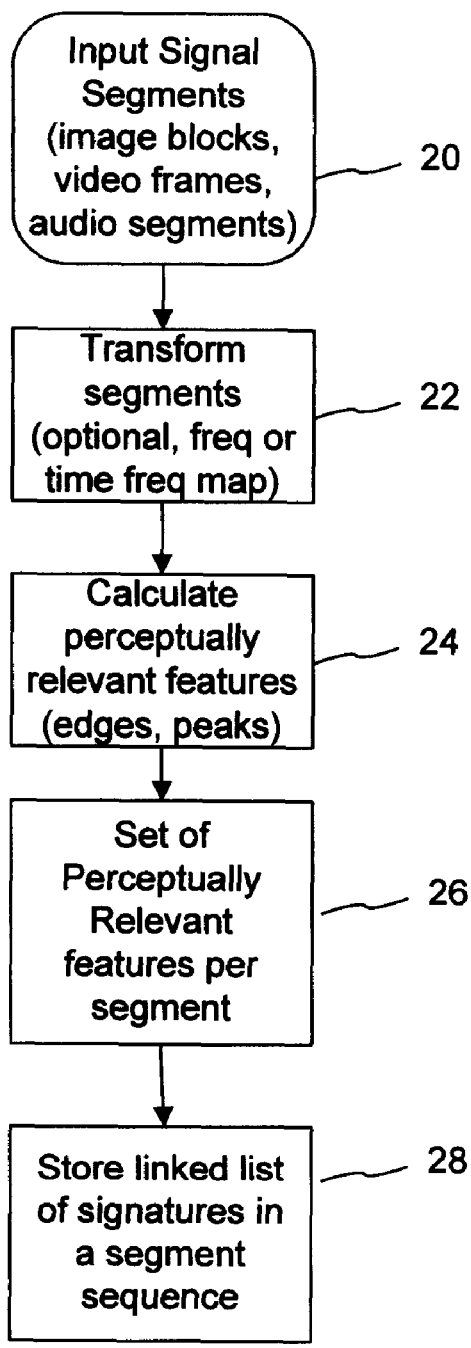
FIG. 1 is a flow diagram of a content signature generating method.

A more dynamic signature deriving process is discussed with respect to FIG. 1. With reference to FIG. 1, an input signal is segmented in step 20. The signal may be an audio, video, or image signal, and may be divided into sets such as segments, frames, or blocks, respectively. Optionally, the sets may be further reduced into respective sub-sets. In step 22, the segmented signal is transformed into a frequency domain (e.g., a Fourier transform domain), or time-frequency domain. Applicable transformation techniques and related frequency-based analysis are discussed in Assignee's Ser. No. 09/661,900 Patent Application (now U.S. Pat. No. 6,674, 876), referenced above. Of course other frequency transformation techniques may be used.

A transformed set's relevant features (e.g., perceptual relevant features represented via edges; magnitude peaks, frequency characteristics, etc.) are identified per set in step 24. For example, a set's perceptual features, such as an object's edges in a frame or a transition of such edges between frames, are identified, analyzed or calculated. In the case of a video signal, perceptual edges may be identified, analyzed, and/or broken into a defining map (e.g., a representation of the edge, the edge location relevant to the segment's orientation, and/or the edge in relation to other perceptual edges.). In another example, frequency characteristics such as magnitude peaks having a predetermined magnitude, or a relatively significant magnitude, are used for such identifying markers. These identifying markers can be used to form the relevant signature.

Edges can also be used to calculate an object's center of mass, and the center of mass may be used as identifying information (e.g., signature components) for an object. For example, after thresholding edges of an object (e.g., identifying the edges), a centering algorithm may be used to locate an object's center of mass. A distance (e.g., up, down, right, left, etc.) may be calculated from the center of mass to each edge, or to a subset of edges, and such dimensions may be used as a signature for the object or for the frame. As an alternative, the largest object (or set of objects) may be selected for such center of mass analysis.

In another embodiment, a generalized Hough transform is used to convert content items such as video and audio signals into a signature. A continuous sequence of the signatures is generated via such a transform. The signature sequence can then be stored for future reference. The identification of the signature is through the transformation of the sequence of signatures. Trellis decoding and Viterbi decoding can be used in the database resolution of the signature.

In step 26, the set's relevant features (e.g., perceptual features, edges, largest magnitude peaks, center of mass, etc.) are grouped or otherwise identified, e.g., thorough a hash, mathematical relationship, orientation, positioning, or mapping to form a representation for the set. This representation is preferably used as a content signature for the set. This content signature may be used as a unique identifier for the set, an identifier for a subset of the content item, or as a signature for the entire content item. Of course, a signature need not be derived for every set (e.g., segment, frame, or block) of a content item. Instead, a signature may be derived for alternating sets or for every nth set, where n is an integer of one or more.

As shown in step 28, resulting signatures are stored. In one example, a set of signatures, which represents a sequence of segments, frames or blocks, is linked (and stored) together. For example, signatures representing sequential or alternating segments in an audio signal may be linked (and stored) together. This linking is advantageous when identifying a content item from a partial stream of signatures, or when the signatures representing the beginning of a content item are unknown or otherwise unavailable (e.g., when only the middle 20 seconds of an audio file are available). When perceptually relevant features are used to determine signatures, a linked list of such signatures may correspond to transitions in the perceptually relevant data between frames (e.g., in video). A hash may also be optionally used to represent such a linked list of signatures.

There are many possible variations for storing a signature or a linked list of signatures. The signature may be stored along with the content item in a file header (or footer) of the segment, or otherwise be associated with the segment. In this case, the signature is preferably recoverable as the file is transferred, stored, transformed, etc. In another embodiment, a segment signature is stored in a segment header (or footer). The segment header may also be mathematically modified (e.g., encrypted with a key, XORed with an ID, etc.) for additional security. The stored content signature can be modified by the content in that segment, or hash of content in that segment, so that it is not recoverable if some or all of content is modified, respectively. The mathematical modification helps to prevent tampering, and to allow recovery of the signature in order to make a signature comparison. Alternatively, the signatures may be stored in a database instead of, or in addition to, being stored with the content item. The database may be local, or may be remotely accessed through a network such as a LAN, WAN, wireless network or internet. When stored in a database, a signature may be linked or associated with additional data. Additional data may include identifying information for the content (e.g., author, title, label, serial numbers, etc.), security information (e.g., copy control), data specifying actions or behavior (e.g., providing a URL, licensing information or rights, etc.), context information, metadata, etc.

To illustrate one example, software executing on a user device (e.g., a computer, PVR, MP3 player, radio, etc.) computes a content signature for a content item (or segments within the content item) that is received or reviewed. The software helps to facilitate communication of the content signature (or signatures) to a database, where it is used to identify the related content item. In response, the database returns related information, or performs an action related to the signature. Such an action may include linking to another computer (e.g., a web site that returns information to the user device), transferring security or licensing information, verifying content and access, etc.

Figure 2:
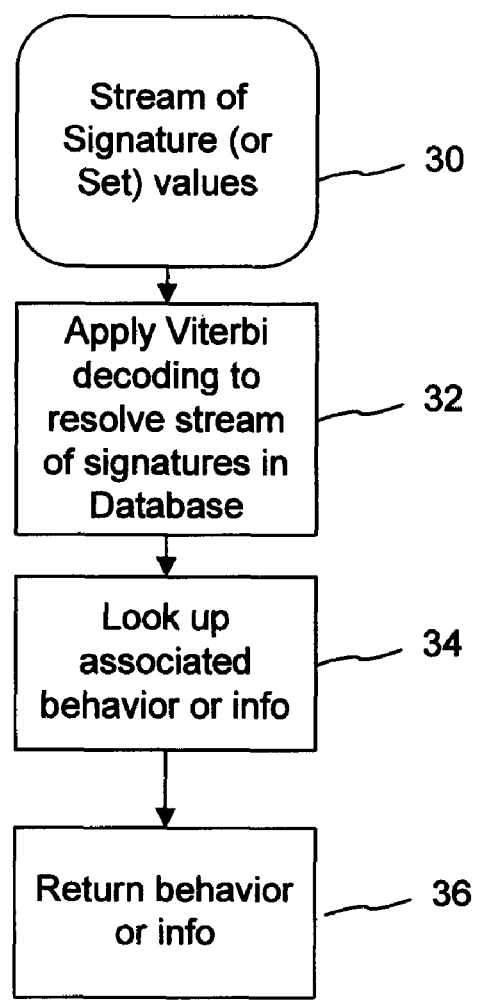
FIG. 2 is a flow diagram of a content signature decoding method.

FIG. 2 is a flow diagram illustrating one possible method to identify a content item from a stream of signatures (e.g., a linked set of consecutive derived signatures for an audio signal). In step 32, Viterbi decoding (as discussed further below) is applied according to the information supplied in the stream of signatures to resolve the identify of the content item. The Viterbi decoding efficiently matches the stream to the corresponding content item. In this regard, the database can be thought of as a trellis structure of linked signatures or signature sequences. A Viterbi decoder can be used to match (e.g., corresponding to a minimum cost function) a stream with a corresponding signature in a database. Upon identifying the content item, the associated behavior or other information is indexed in the database (step 34). Preferably, the associated behavior or information is returned to the source of the signature stream (step 36).

Figure 3:
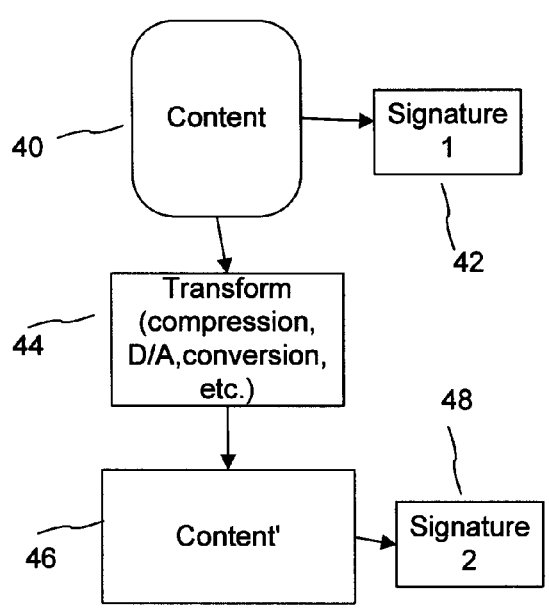
FIG. 3 is a diagram illustrating generation of a plurality of signatures to form a list of signatures.
Figure 4:
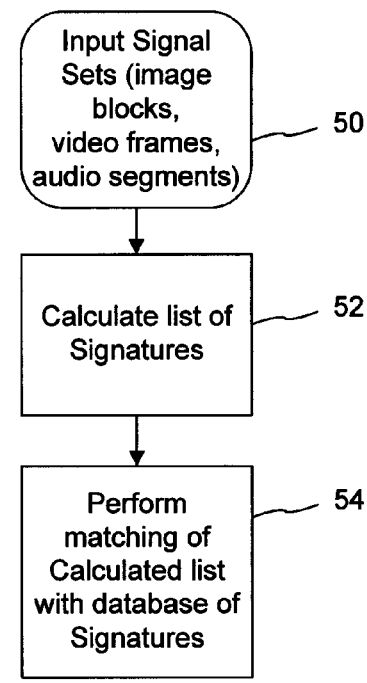
FIG. 4 is a flow diagram illustrating a method to resolve a content ID of an unknown content item.

FIGS. 3 and 4 are diagrams illustrating an embodiment of the present invention in which a plurality of content signatures is utilized to identify a content item. As illustrated in FIG. 3, a content signature 42 is calculated or determined (e.g., derived) from content item 40. The signature 42 may be determined from a hash (e.g., a manipulation which represents the content item 40 as an item having fewer bits), a map of key perceptual features (magnitude peaks in a frequency-based domain, edges, center of mass, etc.), a mathematical representation, etc. The content 40 is manipulated 44, e.g., compressed, transformed, D/A converted, etc., to produce content' 46. A content signature 48 is determined from the manipulated content' 46. Of course, additional signatures may be determined from the content, each corresponding to a respective manipulation. These additional signatures may be determined after one manipulation from the original content 40, or the additional signatures may be determined after sequential manipulations. For example, content' 46 may be further manipulated, and a signature may be determined based on the content resulting from that manipulation. These signatures are then stored in a database. The database may be local, or may be remotely accessed through a network (LAN, WAN, wireless, internet, etc.). The signatures are preferably linked or otherwise associated in the database to facilitate database look-up as discussed below with respect to FIG. 4.

FIG. 4 is a flow diagram illustrating a method to determine an identification of an unknown content item. In step 50, a signal set (e.g., image block, video frame, or audio segment) is input into a system, e.g., a general-purpose computer programmed to determine signatures of content items. A list of signatures is determined in step 52. Preferably, the signatures are determined in a corresponding fashion as discussed above with respect to FIG. 3. For example, if five signatures for a content item, each corresponding to a respective manipulation (or a series of manipulations) of the content item, are determined and stored with respect to a subject content item, then the same five signatures are preferably determined in step 52. The list of signatures is matched to the corresponding signatures stored in the database. As an alternative embodiment, subsets or levels of signatures may be matched (e.g., only 2 of the five signatures are derived and then matched). The security and verification confidence increases as the number of signatures matched increases.

A set of perceptual features of a segment (or a set of segments) can also be used to create "fragile" signatures. The number of perceptual features included in the signature can determine its robustness. If the number is large, a hash could be used as the signature.

Digital Watermarks and Content Signatures

Content signatures may be used advantageously in connection with digital watermarks.

A digital watermark may be used in conjunction with a content signature. The watermark can provide additional information, such as distributor and receiver information for tracking the content. The watermark data may contain a content signature and can be compared to the content signature at a later time to determine if the content is authentic. A content signature also can be compared to digital watermark data, and if the content signature and digital watermark data match (or otherwise coincide) the content is determined to be authentic. If different, however, the content is considered modified.

A digital watermark may be used to scale the content before deriving a content signature of the content. Content signatures are sensitive to scaling (and/or rotation, distortion, etc.). A watermark can include a calibration and/or synchronization signal to realign the content to a base state. Or a technique can be used to determine a calibration and/or synchronization based upon the watermark data during the watermark detection process. This calibration signal (or technique) can be used to scale the content so it matches the scale of the content when the content signature was registered in a database or first determined, thus reducing errors in content signature extraction.

Indeed, a content signature can be used to identify a content item (as discussed above), and a watermark is used to supply additional information (owner ID, metadata, security information, copy control, etc). The following example is provided to further illustrate the interrelationship of content signatures and digital watermarks.

A new version of the Rolling Stones song "Angie" is ripped (e.g., transferred from one format or medium to another). A compliant ripper or a peer-to-peer client operating on a personal computer reads the watermark and calculates the signature of the content (e.g., "Angie"). To ensure that a signature may be rederived after a content item is routinely altered (e.g., rotated, scaled, transformed, etc.), a calibration signal can be used to realign (or retransform) the data before computing the signature. Realigning the content item according to the calibration signal helps to ensure that the content signature will be derived from the original data, and not from an altered original. The calibration signal can be included in header information, hidden in an unused channel or data area, embedded in a digital watermark, etc. The digital watermark and content signature are then sent to a central database. The central database determines from the digital watermark that the owner is, for example, Label X. The content signature is then forwarded to Label X's private database, or to data residing in the central database (depending upon Label X's preference), and this secondary database determines that the song is the new version of "Angie." A compliant ripper or peer-to-peer client embeds the signature (i.e., a content ID) and content owner ID in frame headers in a fashion secure to modification and duplication, and optionally, along with desired ID3v2 tags.

To further protect a signature (e.g., stored in a header or digital watermark), a content owner could define a list of keys, which are used to scramble (or otherwise encrypt) the signature. The set of keys may optionally be based upon a unique ID associated with the owner. In this embodiment, a signature detector preferably knows the key, or gains access to the key through a so-called trusted third party. Preferably, it is optimal to have a signature key based upon content owner ID. Such a keying system simplifies database look-up and organization. Consider an example centered on audio files. Various record labels may wish to keep the meaning of a content ID private. Accordingly, if a signature is keyed with an owner ID, the central database only needs to identify the record label's content owner ID (e.g., an ID for BMG) and then it can forward all BMG songs to a BMG database for their response. In this case, the central database does not need all of the BMG content to forward audio files (or ID's) to BMG, and does not need to know the meaning of the content ID. Instead, the signature representing the owner is used to filter the request.

Content Signature Calculations

For images or video, a content signature can be based on a center of mass of an object or frame, as discussed above. An alternative method is to calculate an object's (or frame's) center of mass is to multiply each pixel's luminescence with its location from the lower left corner (or other predetermined position) of the frame, sum all pixels within the object or frame, and then divide by the average luminescence of the object or frame. The luminescence can be replaced by colors, and a center of mass can be calculated for every color, such as RGB or CMYK, or one color. The center of mass can be calculated after performing edge detection, such as high pass filtering. The frame can be made binary by comparing to a threshold, where a 1 represents a pixel greater than the threshold and a 0 represents a pixel less than the threshold. The threshold can be arbitrary or calculated from an average value of the frame color, luminescence, either before or after edge detection. The center of mass can produce a set of values by being calculated for segments of the frame, in images or video, or for frames over time in video.

Similarly, the average luminescence of a row or block of a frame can be used as the basic building block for a content signature. The average value of each row or block is put together to represent the signature. With video, there could be the calculation of rows and blocks over time added to the set of values representing the signature.

The center of mass can be used for object, when the objects are predefined, such as with MPEG. The center of mass for each object is sequentially combined into a content signature.

One way of identifying audio and video content—apart from digital watermarks—is fingerprinting technology. As discussed herein, such fingerprinting technology generally works by characterizing content by some process that usually—although not necessarily—yields a unique data string. Innumerable ways can be employed to generate the data string. What is important is (a) its relative uniqueness, and (2) its relatively small size. Thus a 1 Mbyte audio file may be distilled down to a 2 Kbyte identifier.

One technique of generating a fingerprint—seemingly not known in the art—is to select frames (video or MP3 segments, etc.) pseudorandomly, based on a known key, and then performing a hashing or other lossy transformation process on the frames thus selected.

Content Signature Applications

One longstanding application of such technology has been in monitoring play-out of radio advertising. Advertisements are "fingerprinted," and the results stored in a database. Monitoring stations then process radio broadcasts looking for audio that has one of the fingerprints stored in the database. Upon finding a match, play-out of a given advertisement is confirmed.

Some fingerprinting technology may employ a "hash" function to yield the fingerprint. Others may take, e.g., the most significant bit of every $10^{th}$ sample value to generate a fingerprint. Etc., etc. A problem arises, however, if the content is distorted. In such case, the corresponding fingerprint may be distorted too, wrongly failing to indicate a match.

In accordance with this aspect of the present invention, content is encoded with a steganographic reference signal by which such distortion can be identified and quantized. If the reference data in a radio broadcast indicates that the audio is temporally scaled (e.g., by tape stretch, or by psycho-acoustic broadcast compression technology), the amount of scaling can be determined. The resulting information can be used to compensate the audio before fingerprint analysis is performed. That is, the sensed distortion can be backed-out before the fingerprint is computed. Or the fingerprint analysis process can take the known temporal scaling into account when deriving the corresponding fingerprint. Likewise with distorted image and video. By such approaches, fingerprint technology is made a more useful technique.

(Pending application Ser. No. 09/452,023, filed Nov. 30, 1999 (now U.S. Pat. No. 6,408,082), details such a reference signal (sometimes termed a "grid" signal, and its use in identifying and quantizing distortion. Pending application Ser. No. 09/689,250 (now U.S. Pat. No. 6,512,837) details various fingerprint techniques.)

In a variant system, a watermark payload—in addition to the steganographic reference signal—is encoded with the content. Thus, the hash (or other fingerprint) provides one identifier associated with the content, and the watermark provides another. Either can be used, e.g., to index related information (such as connected content). Or they can be used jointly, with the watermark payload effectively extending the ID conveyed by the hash (or vice versa).

In addition, the grid signal discussed above may consist of tiles, and these tiles can be used to calibrate content signatures that consist of a set of sub-fingerprints. For example, the tile of the grid can represent the border or block for each of the calculations of the sub-fingerprints, which are then combined into a content signature.

A technique similar to that detailed above can be used in aiding pattern recognition. Consider services that seek to identify image contents, e.g., internet porn filtering, finding a particular object depicted among thousands of frames of a motion picture, or watching for corporate trademarks in video media. (Cobion, of Kassel, Germany, offers some such services.) Pattern recognition can be greatly for-shortened if the orientation, scale, etc., of the image are known. Consider the Nike swoosh trademark. It is usually depicted in horizontal orientation. However, if an image incorporating the swoosh is rotated 30 degrees, its recognition is made more complex.

To redress this situation, the original image can be steganographically encoded with a grid (calibration) signal as detailed in the Ser. No. 09/452,023 (now U.S. Pat. No. 6,408,082) application. Prior to performing any pattern recognition on the image, the grid signal is located, and indicates that the image has been rotated 30 degrees. The image can then be counter-rotated before pattern recognition is attempted.

Fingerprint technology can be used in conjunction with digital watermark technology in a variety of additional ways. Consider the following.

One is to steganographically convey a digital object's fingerprint as part of a watermark payload. If the watermark-encoded fingerprint does not match the object's current fingerprint, it indicates the object has been altered.

A watermark can also be used to trigger extraction of an object's fingerprint (and associated action based on the fingerprint data). Thus, one bit of a watermark payload, may signal to a compliant device that it should undertake a fingerprint analysis of the object.

In other arrangements, the fingerprint detection is performed routinely, rather than triggered by a watermark. In such case, the watermark can specify an action that a compliant device should perform using the fingerprint data. (In cases where a watermark triggers extraction of the fingerprint, a further portion of the watermark can specify a further action.) For example, if the watermark bit has a "0" value, the device may respond by sending the fingerprint to a remote database; if the watermark bit has a "1" value, the fingerprint is stored locally.

Still further, frail (or so-called fragile) watermarks can be used in conjunction with fingerprint technology. A frail or fragile watermark is designed to be destroyed, or to degrade predictably, upon some form of signal processing. In the current fingerprinting environment, if a frail watermark is detected, then a fingerprint analysis is performed; else not. And/or, the results of a fingerprint analysis can be utilized in accordance with information conveyed by a frail watermark. (Frail watermarks are disclosed, e.g., in application Ser. Nos. 09/234,780, 09/433,104 (now U.S. Pat. No. 6,636,615), application Ser. Nos. 60/198,138, 09/616,462 (now U.S. Pat. No. 6,332,031), application Ser. No. 09/645,779 (now U.S. Pat. No. 6,714,683), application Ser. Nos. 60/232,163, 09/689,293 (now U.S. Pat. No. 6,683,966), and application Ser. No. 09/689,226 (now U.S. Pat. No. 6,694,041).)

Content Signatures from Compressed Data

Content signatures can be readily employed with compressed or uncompressed data content. One inventive method determines the first n significant bits (where n is an integer, e.g., 64) of a compression signal and uses the n bits as (or to derive) a signature for that signal. This signature technique is particularly advantageous since, generally, image compression schemes code data by coding the most perceptually relevant features first, and then coding relevantly less significant features from there. Consider JPEG 2000 as an example. As will be appreciated by those skilled in that art, JPEG 2000 uses a wavelet type compression, where the image is hierarchically sub-divided into sub-bands, from low frequency perceptually relevant features, to higher frequency lesser perceptually relevant features. Using the low frequency information as a signature (or a signature including a hash of this information) creates a perceptually relevant signature.

The largest frequency components from a content item (e.g., a video signal) can use the compressed or uncompressed data to determine a signature. For example, in an MPEG compressed domain, large scaling factors (e.g., 3 or more of the largest magnitude peaks) are identified, and these factors are used as a content signature or to derive (e.g., a mapping or hash of the features) a content signature. As an optional feature, a content item is low pass filtered to smooth rough peaks in the frequency domain. As a result, the large signature peaks are not close neighbors.

Continuing this idea with time varying data, transitions in perceptually relevant data of frames of audio/video over time can be tracked to form a unique content signature. For example, in compressed video, a perceptually relevant hash of n frames can be used to form a signature of the content. In audio, the frames correspond to time segments, and the perceptually relevant data could be defined similarly, based on human auditory models, e.g., taking the largest frequency coefficients in a range of frequencies that are the most perceptually significant. Accordingly, the above inventive content signature techniques are applicable to compressed data, as well as uncompressed data.

Cue Signals and Content Signatures

Cue signals are an event in the content, which can signal the beginning of a content signature calculation. For example, a fade to black in video could be a cue to start calculating (e.g., deriving) the content signature, either for original entry into the database or for database lookup.

If the cue signal involves processing, where the processing is part of the content signature calculation, the system will be more efficient. For example, if the content signature is based upon frequency peaks, the cue signal could be a specific pattern in the frequency components. As such, when the cue signal is found, the content signature is partially calculated, especially if the content signature is calculated with content before the cue (which should be saved in memory while searching for the cue signal). Other cue signals may include, e.g., I-frames, synchronization signals, and digital watermarks.

In the broadcast monitoring application, where the presence and amount of content is measured, such as an advertisement on TV, timing accuracy (e.g., with a 1 sec.) is required. However, cue signals do not typically occur on such a regular interval (e.g., 1 sec.). As such, content signatures related to a cue signal can be used to identify the content, but the computation of the content to locate the cue signal elements are saved to determine timing within the identified content. For example, the cue signal may include the contrast of the center of the frame, and the contrast from frame to frame represents the timing of the waveform and is saved. The video is identified from several contrast blocks, after a specific cue, such as fade to black in the center. The timing is verified by comparing the pre-existing and future contrasts of the center frame to those stored in the database for the TV advertisement.

Content signatures are synchronized between extraction for entry into the database and for extraction for identifying the unknown content by using peaks of the waveform envelope. Even when there is an error calculating the envelope peak, if the same error occurs at both times of extraction, the content signatures match since they are both different by the same amount; thus, the correct content is identified.

List Decoding and Trellis Coded Quantization

The following discussion details another method, which uses Trellis Coded Quantization (TCQ), to derive a content signature from a content item. Whereas the following discussion uses an image for an example, it will be appreciated by one of ordinary skill in the art that the concepts detailed below can be readily applied to other content items, such as audio, video, etc. For this example, an image is segmented into blocks, and real numbers are associated with the blocks. In a more general application of this example, a set of real numbers is provided and a signature is derived from the set of real numbers.

Initial Signature Calculation

Figure 5:
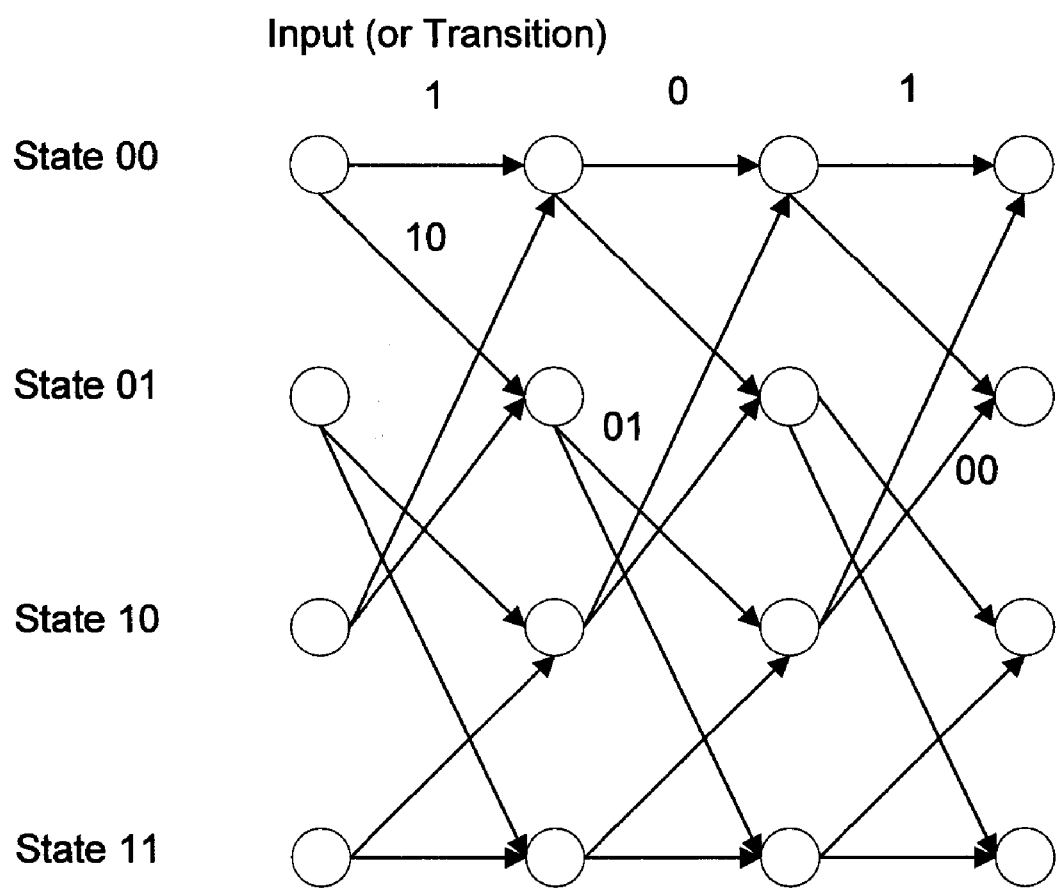
FIG. 5 illustrates an example of a trellis diagram.
Figure 6:
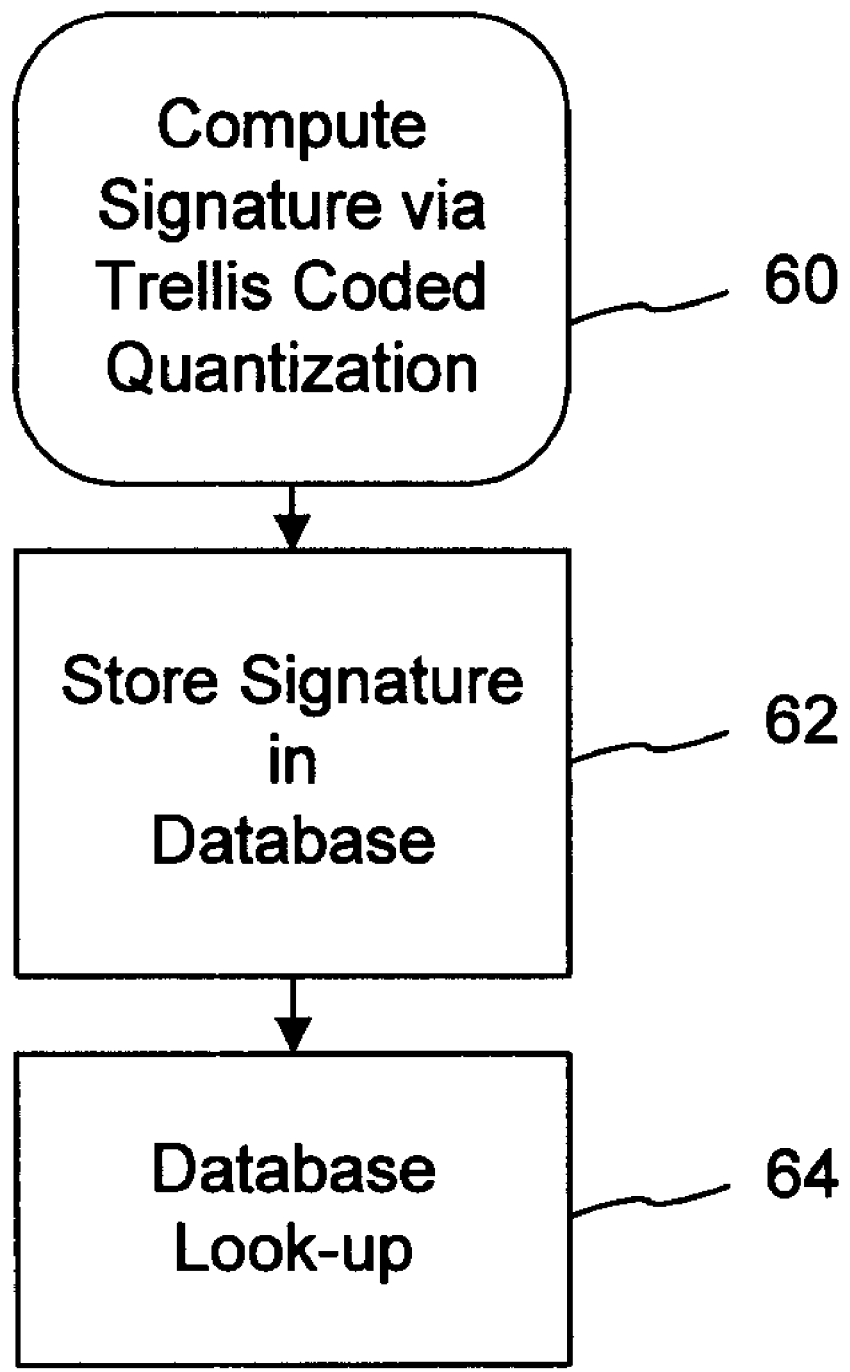
FIG. 6 is a flow diagram illustrating a method of applying Trellis Coded Quantization to generate a signature.
Figure 7:
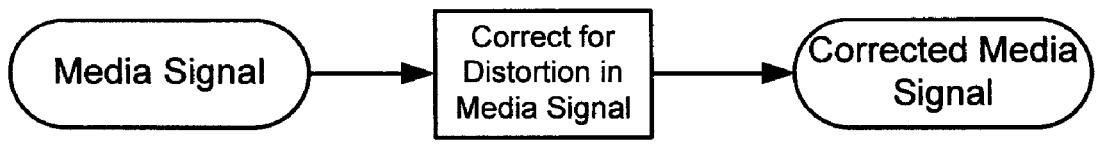
FIG. 7 is a diagram illustrating correcting distortion in a media signal (e.g., the media signal representing an image, audio or video).
Figure 8:
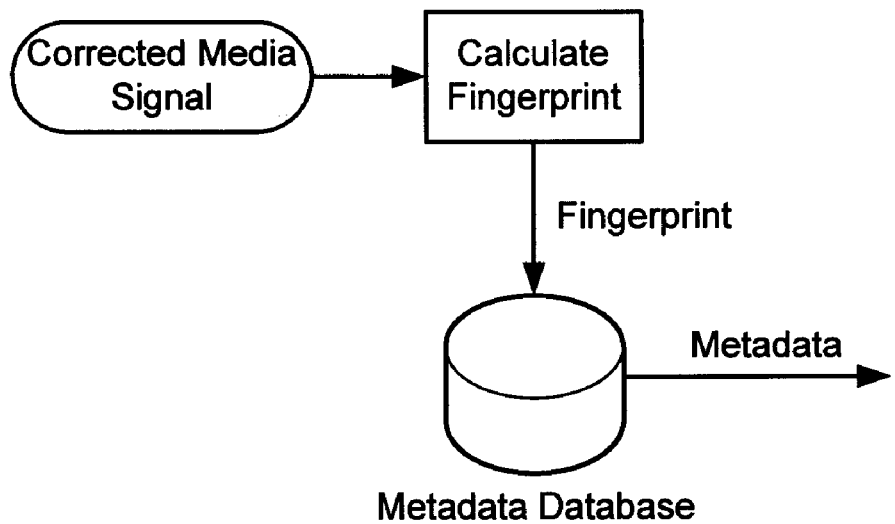
FIG. 8 is a diagram illustrating the use of a fingerprint, derived from a corrected media signal, to obtain metadata associated with the media signal.

In step 60 of FIG. 6, TCQ is employed to compute an N-bit hash of N real numbers, where N is an integer. The N real numbers may correspond to (or represent) an image, or may otherwise correspond to a data set. This method computes the hash using a Viterbi algorithm to calculate the shortest path through a trellis diagram associated with the N real numbers. A trellis diagram, a generalized example of which is shown in FIG. 5, is used to map transition states (or a relationship) for related data. In this example, the relationship is for the real numbers. As will be appreciated by those of ordinary skill in the art, the Viterbi algorithm finds the best state sequence (with a minimum cost) through the trellis. The resulting shortest path is used as the signature. Further reference to Viterbi Decoding Algorithms and trellis diagrams may be had to "List Viterbi Decoding Algorithms with Applications," IEEE Transactions on Communications, Vol. 42, No. 2/3/4, 1994, pages 313-322, hereby incorporated by reference.

One way to generate the N real numbers is to perform a wavelet decomposition of the image and to use the resulting coefficients of the lowest frequency sub-band. These coefficients are then used as the N real numbers for the Viterbi decoding (e.g., to generate a signature or hash).

One way to map a larger set of numbers M to an N bit hash, where M>N and M and N are integers, is to use trellis coded vector quantization, where the algorithm deals with sets of real numbers, rather than individual real numbers. The size and complexity for a resulting signature may be significantly reduced with such an arrangement.

In step 62 (FIG. 6), the initial signature (e.g., hash) is stored in a database. Preferably, the signature is associated with a content ID, which is associated with a desired behavior, information, or action. In this manner, a signature may be used to index or locate additional information or desired behavior.

Recalculating Signatures for Matching in the Database

In a general scenario, a content signature (e.g., hash) is recalculated from the content item as discussed above with respect to Trellis Coded Quantization.

In many cases, however, a content signal will acquire noise or other distortion as it is transferred, manipulated, stored, etc. To recalculate the distorted content signal's signature (e.g., calculate a signature to be used as a comparison with a previously calculated signature), the following steps may be taken. Generally, list decoding is utilized as a method to identify the correct signature (e.g., the undistorted signature). As will be appreciated by one of ordinary skill in the art, list decoding is a generalized form of Viterbi decoding, and in this application is used to find the most likely signatures for a distorted content item. List decoding generates X the most likely signatures for the content item, where X is an integer. To do so, a list decoding method finds the X shortest paths (e.g., signatures) through a related trellis diagram. The resulting X shortest paths are then used as potential signature candidates to find the original signature.

As an alternative embodiment, and before originally computing the signature (e.g., for storage in the database), a calibration watermark is embedded in the content item, and possibly with one or more bits of auxiliary data. A signature is then calculated which represents the content with the watermark signal. The calibration watermark assists in re-aligning the content after possible distortion when recomputing a signature from a distorted signal. The auxiliary data can also be used as an initial index into the database to reduce the complexity of the search for a matching a signature. Database lookup time is reduced with the use of auxiliary data.

In the event that a calibration watermark is included in the content, the signature is recomputed after re-aligning the content data with calibration watermark. Accordingly, a signature of the undistorted, original (including watermark) content can be derived.

Database Look-up

Once a content signature (e.g., hash) is recalculated in one of the methods discussed above, a database query is executed to match recalculated signatures against stored signatures, as shown in step 64 (FIG. 6). This procedure, for example, may proceed according to known database querying methods.

In the event that list decoding generates X most likely signatures, the X signatures are used to query the database until a match is found. Auxiliary data, such as provided in a watermark, can be used to further refine the search. A user may be presented with all possible matches in the event that two or more of the X signatures match signatures in the database.

A progressive signature may also be used to improve database efficiency. For example, a progressive signature may include a truncated or smaller hash, which represents a smaller data set or only a few (out of many) segments, blocks or frames. The progressive hash may be used to find a plurality of potential matches in the database. A more complete hash can then be used to narrow the field from the plurality of potential matches. As a variation of this progressive signature matching technique, soft matches (e.g., not exact, but close matches) are used at one or more points along the search. Accordingly, database efficiency is increased.

Database lookup for content signatures can use a database configuration based upon randomly addressable memory (RAM). In this configuration, the database can be pre-organized by neighborhoods of related content signatures to speed detection. In addition, the database can be searched in conventional methods, such as binary tree methods.

Given that the fingerprint is of fixed size, it represents a fixed number space. For example, a 32-bit fingerprint has 4 billion potential values. In addition, the data entered in the database can be formatted to be a fixed size. Thus, any database entry can be found by multiplying the fingerprint by the size of the database entry size, thus speeding access to the database.

Content Addressable Memory

Another inventive alternative uses a database based on content addressable memory (CAM) as opposed to RAM. CAM devices can be used in network equipment, particularly routers and switches, computer systems and other devices that require content searching.

Operation of a CAM device is unlike that of a RAM device. For RAM, a controller provides an address, and the address is used to access a particular memory location within the RAM memory array. The content stored in the addressed memory location is then retrieved from the memory array. A CAM device, on the other hand, is interrogated by desired content. Indeed, in a CAM device, key data corresponding to the desired content is generated and used to search the memory locations of the entire CAM memory array. When the content stored in the CAM memory array does not match the key data, the CAM device returns a "no match" indication. When the content stored in the CAM memory array matches the key data, the CAM device outputs information associated with the content. Further reference to CAM technology can be made to U.S. Pat. Nos. 5,926,620 and 6,240,003, which are each incorporated herein by reference.

CAM is also capable of performing parallel comparisons between input content of a known size and a content table completely stored in memory, and when it finds a match it provides the desired associated output. CAM is currently used, e.g., for Internet routing. For example, an IP address of 32 bits can be compared in parallel with all entries in a corresponding 4-gigabit table, and from the matching location the output port is identified or linked to directly. CAM is also used in neural networks due to the similarity in structure. Interestingly, it is similar to the way our brain functions, where neurons perform processing and retain the memory—as opposed to Van Neumann computer architecture, which has a CPU, and separate memory that feeds data to the CPU for processing.

CAM can also be used in identifying fingerprints with metadata.

For file based fingerprinting, where one fingerprint uniquely identifies the content, the resulting content fingerprint is of a known size. CAM can be used to search a complete fingerprint space as is done with routing. When a match is found, the system can provide a web link or address for additional information/metadata. Traditionally CAM links to a port, but it can also link to memory with a database entry, such as a web address.

CAM is also useful for a stream-based fingerprint, which includes a group of sub-fingerprints. CAM can be used to look up the group of sub-fingerprints as one content signature as described above.

Alternatively, each sub-fingerprint can be analyzed with CAM, and after looking up several sub-fingerprints one piece of content will be identified, thus providing the content signature. From that content signature, the correct action or web link can quickly be found with CAM or traditional RAM based databases.

More specifically, the CAM can include the set of sub-fingerprints with the associated data being the files that include those sub-fingerprints. After a match is made in CAM with an input sub-fingerprint, the complete set of sub-fingerprints for each potential file can be compared to the set of input fingerprints using traditional processing methods based upon hamming errors. If a match is made, the file is identified. If not, the next sub-fingerprint is used in the above process since the first sub-fingerprint must have had an error. Once the correct file is identified, the correct action or web link can quickly be found with CAM or traditional RAM-based databases, using the unique content identification, possibly a number or content name.

Varying Content

Some content items may be represented as a sequence of N bit signatures, such as time varying audio and video content. A respective N bit signature may correspond to a particular audio segment, or video frame, such as an I frame. A database may be structured to accommodate such a structure or sequence.

In one embodiment, a calibration signal or some other frame of reference (e.g., timing, I frames, watermark counter, auxiliary data, header information, etc.) may be used to synchronize the start of the sequence and reduce the complexity of the database. For example, an audio signal may be divided into segments, and a signature (or a plurality of signatures) may be produced for such segments. The corresponding signatures in the database may be stored or aligned according to time segments, or may be stored as a linked list of signatures.

As an alternative, a convolution operation is used to match an un-synchronized sequence of hashes with the sequences of hashes in the database, such as when a synchronization signal is not available or does not work completely. In particular, database efficiency may be improved by a convolution operation such as a Fast Fourier Transform (FFT), where the convolution essentially becomes a multiplication operation. For example, a 1-bit hash may be taken for each segment in a sequence. Then to correlate the signatures, an inverse FFT is taken of the 1-bit hashes. The magnitude peaks associated with the signatures (and transform) are analyzed. Stored signatures are then searched for potential matches. The field is further narrowed by taking progressively larger signatures (e.g., 4-bit hashes, 8-bit hashes, etc.).

As a further alternative, a convolution plus a progress hash is employed to improve efficiency. For example, a first sequence of 1-bit hashes is compared against stored signatures. The matches are grouped as a potential match sub-set. Then a sequence of 2-bit hashes is taken and compared against the second sub-set—further narrowing the potential match field. The process repeats until a match is found.

Dual Fingerprint Approach

An efficiently calculated content signature can be used to narrow the search to a group of content. Then, a more accurate and computationally intense content signature can be calculated on minimal content to locate the correct content from the group. This second more complex content signature extraction can be different than the first simple extraction, or it can be based upon further processing of the content used in the first, but simple, content signature. For example, the first content signature may include peaks of the envelope, and the second content signature comprises the relative amplitude of each Fourier component as compared to the previous component, where a 1 is created when the current component is greater than the previous and a 0 is created when the current component is less than or equal to the previous component As another example, the first content signature may include the three largest Fourier peaks, and the second content signature may include the relative amplitude of each Fourier component, as described in the previous example.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

It should be appreciated that the above section headings are not intended to limit the present invention, and are merely provided for the reader's convenience. Of course, subject matter disclosed under one section heading can be readily combined with subject matter under other headings.

The methods, processes, and systems described above may be implemented in hardware, software or a combination of hardware and software. For example, the transformation and signature deriving processes may be implemented in a programmable computer running executable software or a special purpose digital circuit. Similarly, the signature deriving and matching process and/or database functionality may be implemented in software, electronic circuits, firmware, hardware, or combinations of software, firmware and hardware. The methods and processes described above may be implemented in programs executed from a system's memory (a computer readable medium, such as an electronic, optical, magnetic-optical, or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
receiving a first fingerprint of a media signal;
querying a data repository, using a processor, to identify a plurality of records associated with the first fingerprint;
receiving a second fingerprint of the media signal, wherein the second fingerprint comprises a more refined fingerprint relative to the first fingerprint; and
selecting a record, based at least on the second fingerprint, out of the plurality of records.

2. The method of claim 1 wherein the data repository comprises structure for grouping neighborhoods of related fingerprints.

3. A method comprising:
obtaining data from a remote device, wherein the data comprises a reduced-bit representation of an audio or video signal;
, deriving, using a processor, a fingerprint of the data, wherein the fingerprint of the data serves as an identifier of the audio or video signal, and wherein the fingerprint comprises an even more reduced-bit representation of the audio or video signal relative to the data;
obtaining, using at least the fingerprint, information or content associated with the audio or video signal; and
providing the information or content to the remote device or to a device associated with the remote device.

4. The method of claim 3, wherein the data comprises a first fingerprint of the audio or video signal.

5. The method of claim 4, wherein the fingerprint of the data comprises a more unique identifier of the audio or video signal relative to the first fingerprint of the audio or video signal.

6. The method of claim 3, wherein the data represents perceptual features of the audio or video signal.

7. The method of claim 3, wherein providing the information or content utilizes email.

8. The method of claim 3, wherein the information or content comprises purchasing information for additional audio or video.

9. An article of manufacture including a tangible computer-readable medium having instructions stored thereon that, if executed by a computing device, cause the computing device to perform operations comprising:
obtaining data from a remote device, wherein the data comprises a reduced-bit representation of an audio or video signal;
deriving a fingerprint of the data, wherein the fingerprint of the data serves as an identifier of the audio or video signal, and wherein the fingerprint comprises an even more reduced-bit representation of the audio or video signal relative to the data;
obtaining, using at least the fingerprint, information or content associated with the audio or video signal; and
providing the information or content to the remote device or to a device associated with the remote device.

10. The method of claim 3, wherein the information or content comprises a link to purchase audio or video.

11. A method comprising:
obtaining an audio or video signal;
processing, using a processor, the audio or video signal to produce data representing some, but not all, features of the audio or video signal;
communicating the data to a remote computer server; and
receiving, from the remote computer server, information or content associated with the audio or video signal, wherein the information or content is obtained using a fingerprint derived from the data, and wherein the fingerprint comprises a more precise identifier of the audio or video signal relative to the data.

12. The method of claim 11, further comprising carrying out an action, using a processor, associated with the information or content.

13. The method of claim 11, wherein the data comprises a first fingerprint of the audio or video signal.

14. The method of claim 13, wherein the fingerprint derived from the data comprises a more unique representation of the audio or video signal relative to the first fingerprint of the audio or video signal.

15. The method of claim 11, wherein the data comprises a reduced-bit representation of the audio or video signal.

16. The method of claim 11, wherein the information or content is received via email.

17. The method of claim 11, wherein the information or content comprises purchasing information for additional audio or video.

18. An article of manufacture including a tangible computer-readable medium having instructions stored thereon that, if executed by a computing device, cause the computing device to perform operations comprising:
obtaining an audio or video signal;
processing the audio or video signal to produce data representing some, but not all, features of the audio or video signal;
communicating the data to a remote computer server; and
receiving, from the remote computer server, information or content associated with the audio or video signal, wherein the information or content is obtained using a fingerprint derived from the data, and wherein the fingerprint comprises a more precise identifier of the audio or video signal relative to the data.

19. The method of claim 11, wherein the information or content comprises a link to purchase audio or video.

20. The method of claim 11, wherein the some, but not all, features of the audio or video signal comprise perceptual features from the audio or video signal.

21. The method of claim 20, wherein the perceptual features are selected from a group of features determined to be perceptually relevant features.

22. The method of claim 3, wherein the some, but not all, features of the audio or video signal comprise perceptual features from the audio or video signal.

23. The method of claim 22, wherein the perceptual features are selected from a group of features determined to be perceptually relevant features.

24. An article of manufacture including a tangible computer-readable medium having instructions stored thereon that if executed by a computing device, cause the computing device to perform operations comprising:
receiving a first fingerprint of a media signal;
querying a data repository to identify a plurality of records associated with the first fingerprint;

receiving a second fingerprint of the media signal, wherein the second fingerprint comprises a more refined fingerprint relative to the first fingerprint; and selecting a record, based at least on the second fingerprint, out of the plurality of records.

25. An apparatus comprising:
a receiver configured to:
  receive a first fingerprint of a media signal; and
  receive a second fingerprint of the media signal, wherein the second fingerprint comprises a more refined fingerprint relative to the first fingerprint; and
a processor configured to:
  query a data repository to identify a plurality of records associated with the first fingerprint; and
  select a record, based at least on the second fingerprint, out of the plurality of records.

26. An apparatus comprising:
a receiver configured to receive data, wherein the data comprises a reduced-bit representation of an audio or video signal;
a processor configured to:
  derive a fingerprint of the data, wherein the fingerprint of the data serves as an identifier of the audio or video signal, and wherein the fingerprint comprises an even more reduced-bit representation of the audio or video signal relative to the data; and
  obtain, using at least the fingerprint, information or content associated with the audio or video signal; and
a provider configured to provide the information or content to the remote device or to a device associated with the remote device.

27. An apparatus comprising:
a receiver configured to receive an audio or video signal;
a processor configured to process the audio or video signal to produce data representing some, but not all, features of the audio or video signal;
a transmitter configured to communicate the data to a remote computer server; and
the receiver further configured to receive information or content associated with the audio or video signal, wherein the information or content is obtained using a fingerprint derived from the data, and wherein the fingerprint comprises a more precise identifier of the audio or video signal relative to the data.

* * * * *

UNITED STATES PATENT AND TRADEMARK OFFICE
CERTIFICATE OF CORRECTION

| | | |
|---|---|---|
| PATENT NO. | : 8,023,773 B2 | |
| APPLICATION NO. | : 11/613876 | |
| DATED | : September 20, 2011 | |
| INVENTOR(S) | : Brunk et al. | |

It is certified that error appears in the above-identified patent and that said Letters Patent is hereby corrected as shown below:

Column 15, line 23, in Claim 2, delete "claim 1" and insert -- claim 1, --.

Column 15, line 30, in Claim 3, delete ", deriving," and insert -- deriving, --.

Column 16, line 8, in Claim 11, delete "server, and" and insert -- server; and --.

Signed and Sealed this
Fifteenth Day of May, 2012

David J. Kappos
*Director of the United States Patent and Trademark Office*